United States Patent [19]

Isbell

[11] Patent Number: 4,688,542
[45] Date of Patent: Aug. 25, 1987

[54] COOKING UNIT

[76] Inventor: Michael S. Isbell, 2180 W. Chateuu Ave., Salt Lake City, Utah 84118

[21] Appl. No.: 768,696

[22] Filed: Aug. 23, 1985

[51] Int. Cl.$^4$ .......................... A47J 37/00; F24B 3/00
[52] U.S. Cl. ................................. 126/25 A; 126/154; 126/9 R
[58] Field of Search ............ 126/9 A, 9 B, 9 R, 25 R, 126/25 A, 25 B, 154; 248/318

[56] References Cited

U.S. PATENT DOCUMENTS

| | | | |
|---|---|---|---|
| 1,566,504 | 12/1925 | Pearsall | 126/154 |
| 2,531,684 | 11/1950 | Jackson | 126/25 A |
| 2,780,215 | 2/1957 | Vacanti, Jr. | 126/25 A |
| 3,018,771 | 1/1962 | Curtis | 126/25 A |
| 3,688,757 | 9/1972 | Dusek | 126/25 A |
| 4,488,535 | 12/1984 | Johnson | 126/25 A |

*Primary Examiner*—James C. Yeung
*Attorney, Agent, or Firm*—B. Deon Criddle

[57] ABSTRACT

This invention comprises an outdoor cooking unit that is portable, versatile, and includes a griddle-type cooking surface and fire box for said fuel. The fire box is adjustable with respect to the griddle to permit the cooking temperature to be varied and the griddle serves as a lid for the fire box during storage of fuel in the box. The fire box is easily removed to permit the griddle to be supported by its legs over an open fire, or the fire box may be used with the griddle, over an open fire as an oven.

6 Claims, 3 Drawing Figures

COOKING UNIT

FIELD OF THE INVENTION

This invention relates to cooking equipment particularly adapted for use over an open cooking fire or a a cooking surface having its own contained cooking fire.

PRIOR ART

The use of griddle-type cooking utensils has been known for a very long period of time. When using such utensils over an open fire it is common to support them on rocks or other support structure and it has generally been difficult to maintain a proper distance between fire and griddle for proper cooking.

OBJECTS OF THE INVENTION

It is a principal object of the present invention to provide a cooking unit having a portable griddle with a fire box in which a solid fuel supply for the griddle can be stored and burned. Another object is to provide a cooking unit with a griddle that can be used over an open fire as an oven.

Another object of the invention is to provide a griddle with an adjustably positioned fire box that will permit the cooking temperatures of the griddle to be controlled.

Another object of this invention is to provide a fire box with means for introducing combustion air to the fuel burning therein and for draining water used to extinguish the burning fuel after use.

Still another object of the present invention is to provide a griddle-type cooking unit in which the griddle cooking surface serves as a lid for the fire box to store solid fuel in the fire box.

FEATURES OF THE INVENTION

Principal features of the invention include a griddle forming a cooking surface; spaced legs supporting said griddle; a fire-box fitting within the legs and beneath the griddle; and interconnecting handle means on the griddle and fire box for adjustably supporting the fire-box beneath the griddle.

Other features include corner vents in the fire box to permit the introduction of combustion air to the interior of the fire box and the draining of water from the interior of the fire box.

Additional objects and features of the invention will become apparent from the following detailed description, drawings and claims.

THE DRAWINGS

In the drawing:

FIG. 1, is a perspective view of the assembled cooking unit of the invention;

FIG. 2, an enlarged vertical section, taken on the line 2—2 of FIG. 1; and

FIG. 3, a side elevation view, showing the adjustable nature of the fire box relative to the griddle.

DETAILED DESCRIPTION

Figure 1:
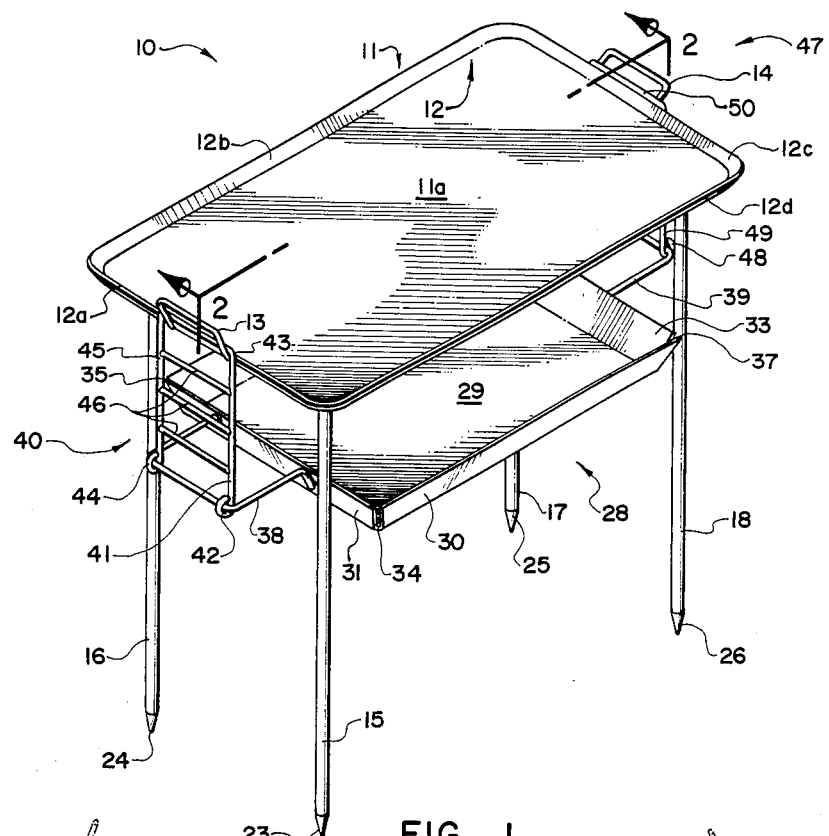

Referring now to the drawings:

In the illustrated preferred embodiment, the cooking unit of the invention, shown generally at 10, includes a griddle 11 with an upper surface 11a that serves as a cooking surface. An upturned peripheral edge 12 extends continuously around griddle 11 and forms four sides 12a 12b, 12c, and 12d respectfully. Handles 13 and 14 are respectfully welded to outer surface of edges 12a and 12c, centrally therealong. Handles 13 and 14 extend outwardly and upwardly with respect to the upper surface 11a.

As shown best in FIG. 1, griddle 11 has legs 15,16,17 and 18 respectivley threaded into nuts 27 which are welded to the underside of griddle 11 at the corner thereof. The ends of the legs 15-18 remote from the griddle are preferably pointed as shown at 23,24, 25 and 26, respectively, so that when pressure is applied on the corners of griddle 11 the points of the legs can be pushed into the earth and the griddle can stabilized and leveled for cooking or can be positioned at a desired height over an open cooking fire.

A fire box, shown generally at 28, is positioned beneath griddle 10 and between the legs 15-18. The fire box includes a bottom surface 29 and side walls 30,31,32, and 33 projecting ourwardly and upwardly from bottom surface 29. The side walls of fire box 28 are not joined at the intersecting corners but are formed to have a vertical slot at each corner. The vertical slots 34,35,36, and 37 respectively extend from the bottom surface 29 to the most upward and outwardly protruding points of each side wall 30,31,32, and 33. The slots, thus spaced about the periphery of the bottom surface 29, permit air to enter the fire box to provide oxygen to fuel being burned therein, even when the fire box is held close to the griddle, as will be further explained.

Handle extensions 38, and 39, respectfully, project horizontally from sides 31 and 33 of fire box 28 to provide attachment means for handles 40 and 47. Handles 40 and 47 are pivotally attached to handle extensions 38 and 39 and include a frame 41 with a bar 42, bent at its ends 42a and 42b to form journals around the handle extensions and bent intermediate its lenght to form parallel legs 42 and 43 and a connecting member 44.

Figure 2:
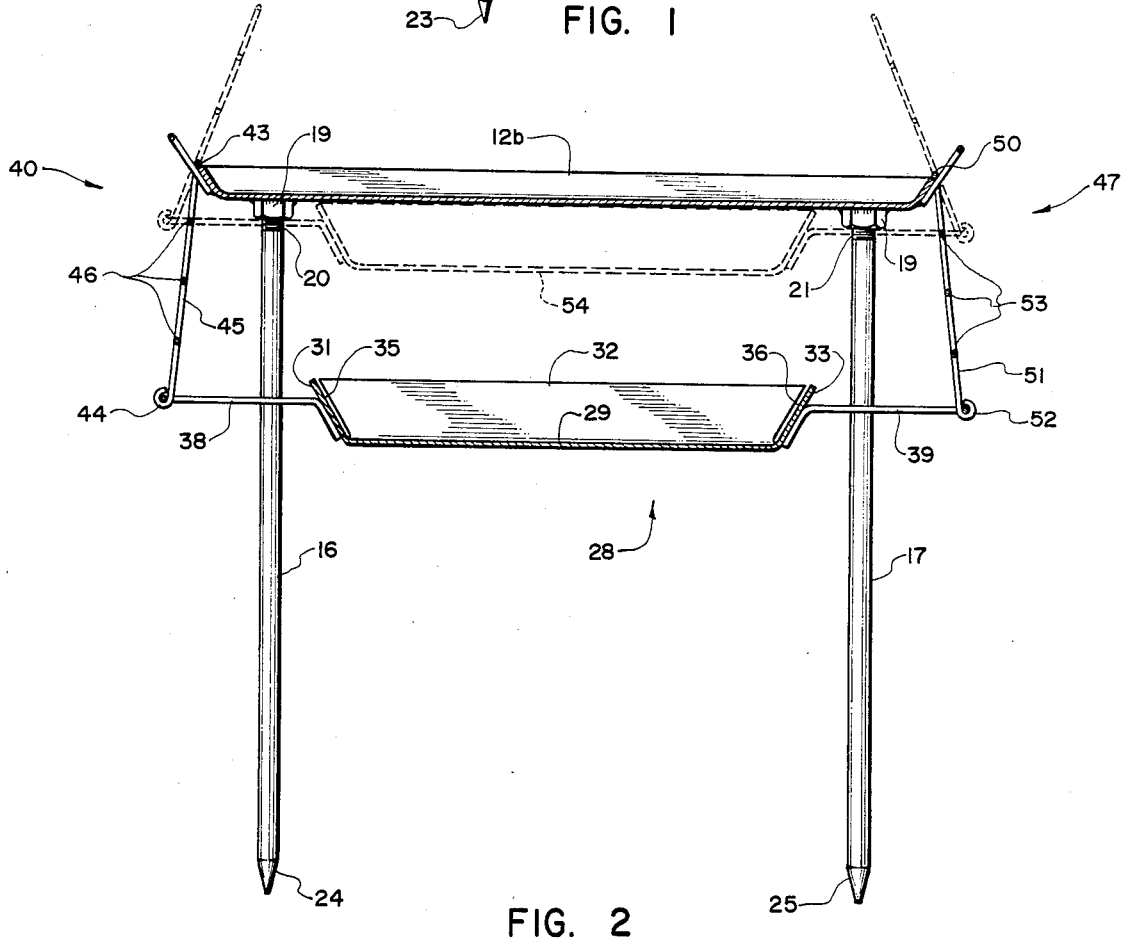

Spaced bars 46,47, and 48 extend parallel to connecting member 44 and interconnect legs 42 and 43. Each of the connector member 44 and spaced bars 46,47, and 48 will fit over a handle 13 and 14 to provide means for suspending the fire box 28 beneath the griddle 11. When the connector members 44 are placed over the handles 13 and 14, as shown in FIG. 2, the top of the fire box is closely spaced beneath the bottom surface of the griddle. Positioning of bars 46 or 47 over the handles 13 and 14 will position the fire box 11 at selected positions between being fully spaced away and closely spaced with respect to the griddle.

Figure 3:
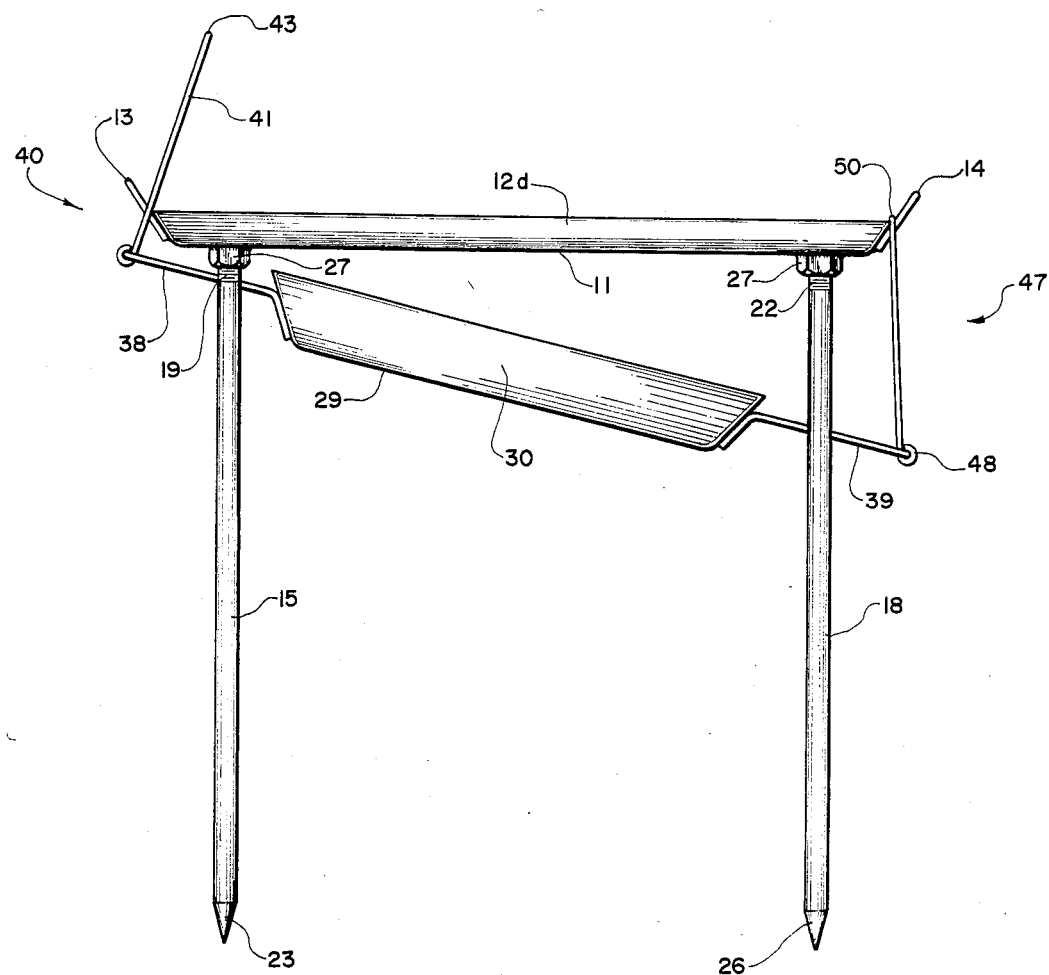

It will be apparent that if a fire is provided in fire box 28 the heat transfer to the griddle can be readily changed by moving the fire box from the appropriate connecting member or bar to maintain the fire box in the desired position. It is also possible to angle the fire box with respect to the griddle (FIG. 3) so that so long as a fire in the fire box maintains its position different degrees of heat will be applied to different portions of the griddle and the griddle can be used to simutaneously cook foods at different cooking rates or to cook and warm foods simultaneously.

It will also be apparent that removing the fire box 28 and placing the griddle 12 over an open fire, supported on the legs, the griddle can be used for cooking purposes. Furthermore if the fire box is left suspended beneath the griddle and is positioned close to the griddle, over an open fire, the fire box and griddle form an oven in which foods can be baked. After cooking with a fire in the fire box, the solid fuel can be flooded with water to extinguish the fire. Solid fuel such as charcoal can be left in the fire box 28 and the water will drain therefrom through the same vertical slots 34, 35, 36 and 37 that provide combustion air to a fire in the fire box.

The griddle 11 and fire box 28 can be stored or transported without spilling solid fuel from the fire box merely by positioning the fire box close to the griddle so that the griddle acts as a lid for the fire box. Naturally, the legs 23–26 can be removed, if desired, for storage and transportation.

Although a preferred embodiment of my invention has been herein described, it is to be understood that the present disclosure is by way of example and that variations are possible without departing from the subject matter coming within the scope of the following claims, which subject matter I regard as my invention.

I claim:

1. A cooking unit comprising
a griddle having handles projecting from opposite sides thereof;
legs supporting said griddle;
a fire box beneath the griddle and between the legs; and
means for adjustably positioning the fire box to change the distance between the bottom of the griddle and the top of the fire box said means including handle means connected to the fire box and suspended from the handles projecting from the griddle to thereby position the fire box relative to the griddle.

2. A cooking unit as in claim 1, wherein
the fire box includes a bottom, and side walls extending upwardly from the bottom towards the griddle, said side walls having openings therebetween to admit air to a fire box and to permit water to drain from the fire box.

3. A cooking unit as in claim 2, wherein
the handle means connected to the fire box includes a plurality of spaced apart parallel bars, each of which will fit over the handles of the griddle.

4. A cooking unit as in claim 3, wherein
one of the spaced bars is arranged so that when positioned over a handle of the griddle the top of the fire box is closely adjacent to the griddle, whereby the griddle serves as a lid to prevent solid fuel falling from the fire box and whereby the griddle and fire box serve as an oven when placed over an open fire between the legs.

5. A cooking unit as in claim 1, wherein
the handle means connected to the fire box includes a plurality of spaced apart parallel bars, each of which will fit over the handles of the griddle.

6. A cooking unit as in claim 1, wherein
the handle means connected to the fire box includes a plurality of spaced apart parallel bars, each of which will fit over the handles of the griddle.

* * * * *